United States Patent [19]
Crosta

[11] Patent Number: 6,086,494
[45] Date of Patent: Jul. 11, 2000

[54] RAISING MACHINE INCLUDING POSITIVELY CONTROLLED RAISING CYLINDERS

[76] Inventor: Emanuele Crosta, Corso Sempione, 67, 21052 Busto Arsizio (Varese), Italy

[21] Appl. No.: 09/109,292

[22] Filed: Jun. 30, 1998

[30] Foreign Application Priority Data

Mar. 23, 1998 [IT] Italy ................................ MI 98A0587

[51] Int. Cl.$^7$ ................................ F16H 7/00; F16H 7/24
[52] U.S. Cl. ............................ 474/88; 474/139; 474/150
[58] Field of Search .................. 474/84, 85, 86, 474/87, 88, 139, 148, 150

[56] References Cited

U.S. PATENT DOCUMENTS

| | | | |
|---|---|---|---|
| 114,341 | 5/1871 | Randolph | 474/85 |
| 2,548,316 | 4/1951 | Locke | 474/85 |
| 3,459,459 | 8/1969 | Eilers | 474/85 |
| 3,949,573 | 4/1976 | Jacobsson | 474/87 |
| 3,965,764 | 6/1976 | Avramidis | 474/85 |
| 4,440,023 | 4/1984 | Landenberger | 474/85 |
| 4,481,005 | 11/1984 | Mann, Jr. | 474/139 |
| 4,634,403 | 1/1987 | Peabody et al. | 474/85 |
| 4,655,733 | 4/1987 | Jonason | 474/85 |
| 5,415,592 | 5/1995 | Hoyt | 474/85 |
| 5,778,287 | 7/1998 | Yu | 474/85 |

Primary Examiner—Vinh T. Luong
Assistant Examiner—Matthew A. Kaness
Attorney, Agent, or Firm—Hedman, Gibson, & Costigan, P.C.

[57] ABSTRACT

A positively controlled raising cylinder raising machine, having a plurality of raising cylinders, circumferentially arranged on a rotary framework, a toothed driving belt for driving the raising cylinders being engaged with a portion of the toothed circular periphery of the raising cylinder, said toothed driving belt being driven by a transmission toothed pulley arranged around a central portion of a circumference defined by the circular periphery of the raising cylinders and operatively coupled to a driving motor, the raising cylinder driving belt being moreover engaged with a pair of switching pulleys holding the driving belt tensioned, the switching pulleys being arranged inside the circular periphery of the raising cylinders on opposite sides of said transmission toothed pulley and near the transmission toothed pulley.

3 Claims, 2 Drawing Sheets

RAISING MACHINE INCLUDING POSITIVELY CONTROLLED RAISING CYLINDERS

BACKGROUND OF THE INVENTION

The present invention relates to a raising machine including positively controlled raising cylinders.

Prior raising machines usually comprise a plurality of raising cylinders, which are circumferentially arranged on a supporting framework which can turn about a rotary axis therefor.

A prior driving system for rotatively driving the raising cylinders provides to use a trapezoidal belt, which, however, is affected by a lot of drawbacks, for example the trend to slipping as said belt is subjected to forces exceeding a set threshold, thereby limiting the operating performance of the raising machine and, accordingly, the raising effect on the fabric material being processed.

Other driving systems, using a plurality of driving gears, have not been found to perform satisfactorily, because of the complexity and great noise of said devices.

A system overcoming the timing problems of the several raising cylinders and preventing the drive system from slipping comprises a raising machine including, for each working cylinder, a toothed pulley, thereabout are entrained a driving belt as well as a timing belt, in order to hold the toothed pulleys synchronized with the teeth of the driving belt.

However, this system, while solving the above mentioned problems, requires to use a timing or synchronization belt affecting all of the raising cylinders.

Moreover, in this prior system, the toothed pulleys pertaining to the raising cylinders must house, on suitable adjoining engagement regions thereof, both the driving belt and the timing belt, with a consequent very complex construction.

SUMMARY OF THE INVENTION

Accordingly, the aim of the present invention is to provide a raising machine, in which the driving or controlling function and the timing function of the raising cylinders are performed by a single belt.

Within the scope of the above mentioned aim, a main object of the present invention is to omit from the raising cylinders any toothed pulleys to be subdivided into several engagement regions.

A further object of the present invention is to provide such a raising machine which, owing to its constructional features, is very reliable and safe in operation and which, moreover, is very competitive from a mere economic standpoint.

According to one aspect of the present invention, the above mentioned aim and objects, as well yet other objects, which will become more apparent hereinafter, are achieved by a raising machine including positively controlled raising cylinders, said raising cylinders being circumferentially arranged on a rotary framework, characterized in that said raising machine comprises moreover a driving belt for driving said raising cylinders, said driving belt affecting all the outer end portions of said raising cylinders.

BRIEF DESCRIPTION OF THE DRAWINGS

Further advantages and characteristics of the present invention will become more apparent hereinafter from the following disclosure, given by way of an illustrative but not limitative example, with reference to the accompanying drawings, where.

DESCRIPTION OF THE PREFERRED EMBODIMENT

In the following disclosure reference will be made to a preferred embodiment of the invention which has been illustrated exclusively by way of a not limitative example of possible variations of the invention.

Figure 1:
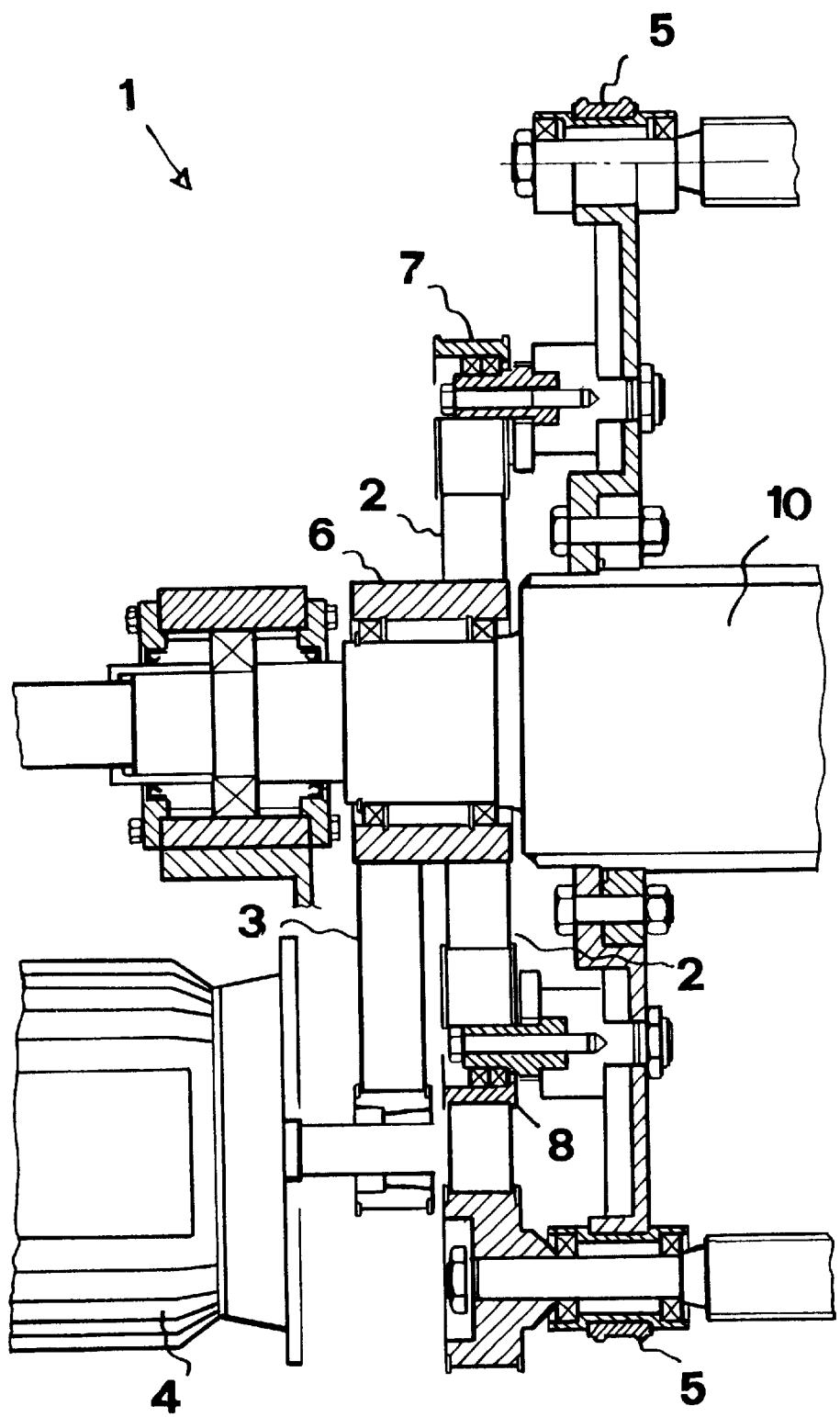
FIG. 1 is a cross-sectional view taken along a vertical plane, of the raising machine according to the present invention.
Figure 2:
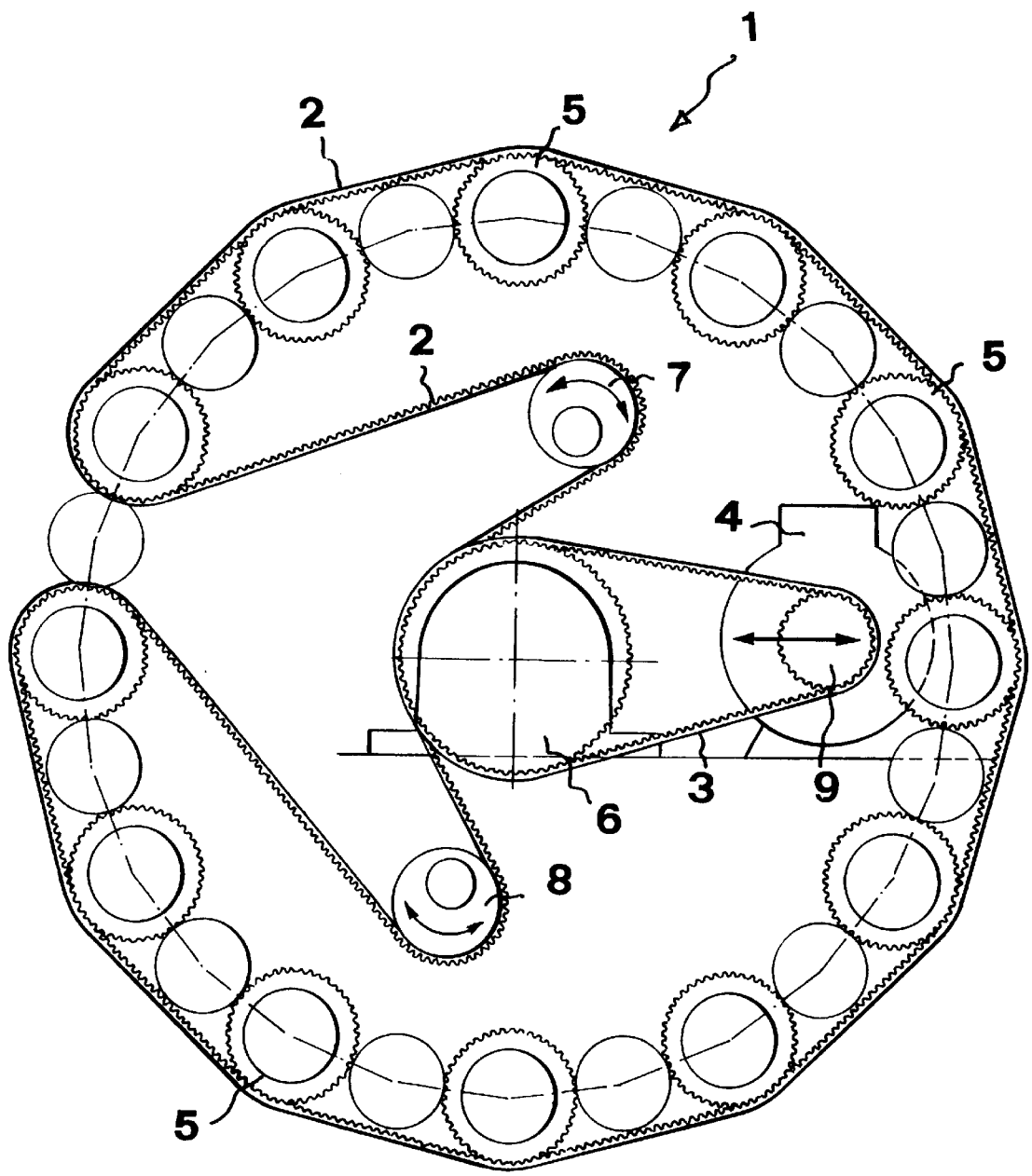
FIG. 2 is a front view taken from the axial end of the raising cylinder of the raising machine shown in FIG. 1.

FIG. 1 is a cross-sectional view, taken along a vertical plane, showing a raising machine according to the present invention, which has been generally indicated by the reference number 1.

The raising machine 1 comprises a plurality of toothed raising cylinders 5 which are circumferentially arranged on a rotary framework 10; said framework 10 being rotatively supported by a fixed supporting framework.

Inside the rotary framework 10 is provided a driving through a driving toothed pulley 9 motor 4 driving a belt 3 which is coupled to a driven toothed pulley 6 in turn driving the raising cylinder 5 assembly.

As shown the pulley 6 has its center substantially coinciding with the center of the circumference defined by the toothed raising cylinders 5, thereby said pulley 6 is arranged substantially centrally inside said circumference.

With the raising cylinder 5 toothed pulley 6 is associated a driving belt 2 for driving said raising cylinders 5, said driving belt having the following unique working arrangement.

More specifically, the driving belt 2 encompasses all the outer end portions of said raising cylinders 5 pertaining to the rotary framework 10 and, moreover, said driving belt 2 is also associated with a pair of switching pulleys 7 and 8 holding said driving belt in a tensioned condition.

In particular, the mentioned switching pulleys 7 and 8 are arranged inside the circumference formed by the raising cylinders 5 and, more specifically, each said switching pulley 8 and 9 is arranged on opposite sides of said toothed pulley 6.

Finally, near said toothed pulley 6, thereby the driving belt 2 extends for a substantial belt portion from said circumference toward the central portion thereof, the driving belt 2 for driving said raising cylinders 5 and the belt of the driving motor 4 are engaged on different regions of the transmission toothed pulley 6.

This arrangement of the raising cylinder 5 driving belt 2 will allow a proper transmission of the driving movement from the toothed pulley 6, in turn driven by the driving motor 4, through the belt 3, to the raising cylinders 5.

This driving of the raising cylinders 5 can be carried out without any provision of a timing belt, since the raising cylinder 5 driving belt tightly encompasses said raising cylinders.

Moreover, the driving belt 2 is always suitably held tensioned by the first switching pulley 7 and second switching pulley 8.

The invention, as disclosed, is susceptible to several modifications and variations, all of which will come within the scope of the invention.

Moreover, all of the constructional details can be replaced by other technically equivalent elements.

In practicing the invention, the used materials, provided that they are compatible to the intended use, as well as the contingent size and shapes, can be any, depending on requirements.

What is claimed is:

1. A positively controlled raising cylinder raising machine, comprising a plurality of raising cylinders, circumferentially arranged on a rotary framework, a toothed driving belt for driving said raising cylinders, said toothed driving belt being engaged with a portion of a toothed circular periphery of each of said raising cylinders, said toothed driving belt being driven by a transmission toothed pulley arranged substantially at a central portion of a circumference defined by said circular periphery of said raising cylinders and operatively coupled to a driving motor, said toothed driving belt being engaged with a pair of switching pulleys holding said driving belt tensioned, said switching pulleys being arranged inside said circular periphery of said raising cylinders on opposite sides of said transmission toothed pulley and closer to said transmission toothed pulley than said circular periphery.

2. A positively controlled raising cylinder raising machine, according to claim 1, wherein said transmission toothed pulley is driven by said driving motor through a second toothed belt.

3. A positively controlled raising cylinder raising machine, according to claim 2, wherein said second toothed belt and said raising cylinder toothed driving belt are engaged on different regions of said transmission toothed pulley.

* * * * *